United States Patent [19]

Guhde et al.

[11] Patent Number: 4,780,153

[45] Date of Patent: Oct. 25, 1988

[54] CHROMIUM-CONTAINING LOW-CURE COATING COMPOSITION

[76] Inventors: Donald J. Guhde, 160 E. 191st St., Euclid, Ohio 44119; Terry E. Dorsett, 11205 Hosford Rd., Chardon, Ohio 44024

[21] Appl. No.: 11,678

[22] Filed: Feb. 6, 1987

[51] Int. Cl.$^4$ .............................................. C23C 22/32
[52] U.S. Cl. .................... 148/6.2; 428/472.1
[58] Field of Search ................. 148/6.2; 428/472.1

[56] References Cited

U.S. PATENT DOCUMENTS

| | | | |
|---|---|---|---|
| 2,206,064 | 7/1940 | Thompson | 148/6.2 |
| 3,382,081 | 5/1968 | Cutter et al. | 106/14 |
| 3,437,531 | 4/1969 | Svadlenak | 148/6.2 |
| 3,468,724 | 9/1969 | Reinhold | 148/6.2 |
| 3,519,501 | 7/1970 | Holden et al. | 148/6.2 |
| 3,671,331 | 6/1972 | Malkin et al. | 148/6.2 |
| 3,940,280 | 2/1976 | deRidder | 106/109 M |
| 3,970,482 | 7/1976 | Gunn | 148/6.2 |
| 3,990,920 | 11/1976 | deRidder et al. | 148/6.2 |
| 4,059,452 | 11/1977 | Nishijima et al. | 106/14 |
| 4,359,345 | 11/1982 | Fonte | 148/6.2 |
| 4,360,377 | 11/1982 | Steck | 148/6.2 |
| 4,384,902 | 5/1983 | Crolty | 148/6.2 |
| 4,500,610 | 2/1985 | Gunn et al. | 428/624 |

FOREIGN PATENT DOCUMENTS 0174469 10/1982 Japan .................... 148/6.2

Primary Examiner—Sam Silverberg
Attorney, Agent, or Firm—John J. Freer

[57] ABSTRACT

A coating composition is now provided which can have a great number of desirable coating characteristics, when the composition is applied and cured on a metal substrate. Moreover, the coating composition has applicability to a great variety of metal substrates. Such substrates include base metal such as steel as well as metal coated substrates such as zinc electroplated steel. Furthermore, the coating compositions can be useful when applied to substrates sensitive to elevated cure temperature, e.g., annealed steel. In one important aspect the composition can contain hexavalent-chromium-providing substance in mixture with cobalt compound. Particulate metal may be present in the composition. A composition furthermore most desirably contains a special organic acid/alcohol reducing agent combination for the hexavalent chromium. The composition can provide a low-cure coating on a metal substrate, which can then translate into higher production line speeds as when used for coating of metal coils.

45 Claims, No Drawings

CHROMIUM-CONTAINING LOW-CURE COATING COMPOSITION

BACKGROUND OF THE INVENTION

Chromium-containing "bonding coating" compositions for metal substrates that are applied prior to painting typically impart corrosion resistance to the surface of the substrate. Such compositions, when applied and cured on a metal substrate, exhibit excellent adherence to the substrate and offer many further desirable characteristics. These include substrate corrosion resistance, the advantage of metal formability without significant coating loss, and retention of substrate weldability. Much of the early efforts with bonding coatings involved developing combinations of hexavalent-chromium-containing substances, often supplied by chromic acid, with a wide variety of reducing agents. For example, U.S. Pat. No. 3,382,081 discloses combinations of organic reducing agents that can include aliphatic dicarboxylic acids in the combination.

Coating characteristics including corrosion resistance can be augmented by including in the pre-paint coating composition a particulate metal, such as finely divided zinc. For example, in U.S. Pat. No. 3,671,331 there are disclosed pulverulent metal-containing chromium bonding coating compositions. These contain, in addition to pulverulent metal such as zinc, the hexavalent-chromium-containing substance plus reducing agent for such substance.

Zinc as a metallic coating has also been widely used to reduce the tendency of iron or steel surfaces to corrode. In the past, the principal methods of applying such coatings were hot-dipping, also known as galvanizing and the electroplating of a zinc layer onto the steel. Zinc has been electroplated on the steel surfaces from various plating baths, preferably from acid plating baths, for providing protection of steel surfaces for various uses. It has also been known as in the U.S. Pat. No. 4,500,610 to improve the corrosion resistance of the coating layer by topcoating the metallic zinc with a bonding coating.

Moreover, it has been shown, as in U.S. Pat. No. 3,990,920, that desirable coating characteristics for these bonding coating compositions can be improved by exercising control over the pH of the coating composition. This is done by introducing a pH adjusting agent into the composition. The agent can enhance compositional stability.

But such compositions must perform a wide variety of functions, and perform them well. It has been found to be extremely difficult to upgrade a particular coating characteristic without downgrading some others. Or without downgrading the coating composition itself, as by retarding shelf life, since these formulations are becoming increasingly complex.

It would nevertheless be desirable to enhance features of the coating composition such as augmented protection for the base metal where a cut or nick may penetrate the coating and expose such metal. It would moreover be desirable to have the composition useful as a coating over a wide variety of substrates including not only steel surfaces but electroplated surfaces such as metallic zinc coated substrates. It would be most desirable if the coating from the composition could furthermore protect the base metal, e.g., steel substrate or the like, where the electroplated layer has been penetrated. Such wide application of the coating composition to substrate metals could furthermore be most desirably extended to include annealed steel substrate metal. However, such metal can be sensitive to applied coating compositions where elevated temperature curing is then needed.

SUMMARY OF THE INVENTION

A coating composition has now been found which can have a wide range of applicability to a variety of substrate metals. For example, the composition can be successfully applied and cured on annealed steel, where a low cure temperature can be critical. Additionally the composition can be readily applied to surfaces such as those containing elemental zinc and provide a desirably adherent coating of good coating characteristics, e.g., weldability for the coated substrate. Moreover the coated substrate can exhibit highly desirable corrosion resistance for nicks and cuts, which penetrate not only through the coating but also through a metal sublayer, such as zinc electroplate, where a substrate or base metal, e.g., steel, is exposed. Moreover these features for the composition can be attained through substitutions in the coating composition constituency, but without deleterious effect on the compositional stability.

In a broad aspect, the present invention is directed to a hexavalent-chromium and pulverulent metal containing coating composition that is at least substantially resin-free, which composition provides corrosion resistance when applied to, and heat cured on, a metal substrate, such composition being especially adapted for application to a plated metal substrate, as well as adapted to low temperature cure thereon, which composition comprises pulverulent metal, hexavalent-chromium-providing compound, cobalt compound and reducing agent for the hexavalent chromium.

In another broad aspect, the present invention is directed to a coating composition in the sense as above described, but comprising pulverulent metal, hexavalent-chromium-providing compound and cobalt compound. In another aspect, the present invention is directed to a coating composition comprising hexavalent-chromium-providing compound, cobalt compound, carboxylic acid and polyhydric alcohol.

Other aspects of the invention include components which may also be useful as coating compositions, which components contain pH modifier at least about 50 weight percent of the modifier being replaced by cobalt compound. In a yet further aspect, the invention is directed to components or low-cure coating compositions which contain reducing agent for hexavalent-chromium compound, the reducing agent including in combination especial carboxylic acid and polyhydric alcohol together with a liquid medium.

In other aspects, the invention is directed to the method of preparing coated metal substrates, where the metal substrates can be base metal or metal coated base metal, as well as being directed to resulting coated metal articles.

DESCRIPTION OF THE PREFERRED EMBODIMENTS

The metal substrates contemplated by the present invention are exemplified by a great number of metals, and these can include alloys and intermetallic mixed metals. For example, such metal substrates may be aluminum and its alloys, zinc and its alloys, copper and cupriferous, e.g., brass and bronze. Additionally, exemplary metal substrates include cadmium, titanium, nickel, and its alloys, tin, cobalt, lead, chromium, magnesium and alloys thereof, and for weldability, preferably a ferrous metal substrate such as iron, stainless steel, or steel such as cold rolled steel or hot rolled and pickled steel. All of these for convenience are usually referred to herein simply as the "substrate" or "base" metal.

Such substrate may receive a coating of elemental metal, e.g., of nickel, copper or zinc as a metal plate or cladding, and be referred to herein for convenience as a "plated" metal substrate. Thus a steel substrate might contain a zinc layer such as a galvanized or electrodeposited zinc coating. Although many such coating metals, including the foregoing and hereinabove mentioned metals, are contemplated, particularly serviceable metals in addition to the nickel, copper and zinc can be cadmium, cobalt and chromium. Alloys may also be useful, e.g., zinc-iron, zinc-aluminum, zinc-cobalt and zinc-nickel.

For the coating composition applied over the metal substrate, or the metal coated metal substrate, the hexavalent chromium in such composition is usually supplied to the coating composition as chromic acid or its equivalent, for example, chromium trioxide or chromic acid anhydride. It is also possible to use salts to supply the hexavalent chromium. These include the calcium, barium, magnesium, zinc, cadmium and strontium dichromates. Generally, the sodium or potassium salts, if present, are used sparingly as they may detract from the coatings corrosion resistance. Occasionally present in minor amounts are also substances such as ammonium dichromate or other hexavalent chromium compounds in addition to those already mentioned. The composition is preferably free from trivalent chromium for best compositional stability, although it is to be understood that some exceedingly minor amount of trivalent chromium, e.g., less than about 0.05 gram per liter, may form in composition that is subjected to long shelf storage before use. Although the chromium may be present in the coating composition in an amount of as little as about 10 grams per liter, expressed as $CrO_3$, it is more typically present in an amount from about 20 to about 60 grams of $CrO_3$ per liter. Substantially concentrated amounts can be as much as 80–100 grams per liter of coating composition although greater than about 200 grams per liter is avoided for economy.

Advantageously for best coating characteristics, the coating composition, which may also be referred to herein for convenience as the "bonding coating" composition or the "pre-paint" coating composition, will contain reducing agent for the hexavalent-chromium. Preferably for best low-cure coating composition characteristic as well as composition stability, the reducing agent will be a combination agent comprising carboxylic acid and polyhydric alcohol. For both the acid and the alcohol it is advantageous for efficient composition preparation that if such substance is insoluble or only sparingly soluble in water, that it at least be completely miscible with water. Preferably for best efficiency, such substance is completely water soluble. It is to be understood that particularly where the acid or alcohol is miscible but not soluble, such can be added to other composition ingredients during complete coating composition preparation, although these ingredients are more usually packaged.

The carboxylic acid will generally be selected from one or more of a $C_2$–$C_{14}$ acid. More usually such acid will be supplied by some to all of a $C_2$–$C_6$ hydroxyl-containing carboxylic acid. Where dicarboxylic acids are used, these will most always include the $C_3$–$C_6$ dicarboxylic acids. Usually when the carboxylic acid reducing agent is present, it will be present in an amount of from about 0.5–50 grams per liter of total coating composition. Less than an amount of about 0.5 gram per liter can be inefficient for providing reducing effect for the hexavalent-chromium, while greater than about 50 grams per liter can be uneconomical. Preferably for best hexavalent-chromium reduction as well as economy, the carboxylic acid, when present, will be present in an amount from about 1–20 grams per liter of the coating composition.

Generally the carboxylic acid will be an aliphatic acid, either straight chain or branched chain, but such may also be a cycloaliphatic acid, or any of such acids in mixture. The acids will most always be saturated acids for efficient composition stability, but if unsaturated acids are present, they will only be present in mixture with saturated acids and then only in very minor amount, e.g., less than 5 to 10 weight percent, basis weight of the saturated acids. Preferably the composition is totally free from unsaturated acids. Acids which can or have been used include malonic, malic, citric, glycolic, lactic, tartaric, tartronic and succinic acids as well as mixtures thereof. Preferably for most desirable chromium reduction as well as a broad range of augmented coating characteristics, the carboxylic acid used will be malic acid.

The carboxylic acid will almost always be present as a reducing agent in combination with polyhydric alcohol. The alcohol can desirably supplement the reducing capability of the acid. For economy, the polyhydric alcohol is advantageously a $C_2$–$C_8$ alcohol. The most useful alcohols are the aliphatic alcohols with the aliphatic being straight, branched or cyclic. The alcohol can be saturated or unsaturated aliphatic alcohol and may contain more than one hydroxyl group, e.g., two such groups, but for economy, will usually contain no more than 3 hydroxyl groups.

The polyhydric alcohol, when present, should be supplied in an amount between about 0.5–50 grams per liter of total composition. Less than about 0.5 gram per liter can be insufficient for providing an efficient reduction of the hexavalent-chromium. Greater than about 50 grams per liter, on the other hand, of the polyhydric alcohol can be uneconomical. Preferably for best chromium reduction, coupled with economy, the polyhydric alcohol will be present in an amount of from about 2 to about 20 grams per liter of total coating composition. Useful polyhydric alcohols include glycerol, ethylene glycol, 1,3-propanediol, 2-butene-1,4-diol, cyclohexanedimethanol, 2-butyne-1,4-diol and their mixtures. Preferably for economy of composition formulation as well as best coating characteristics, the polyhydric alcohol used will be glycerol.

It will be understood that particularly where combinations of reducing agents are to be used, additional reducing agent material may be present in the coating composition. Such additional substances can be exemplified by the dicarboxylic acids as disclosed in U.S. Pat. No. 3,382,081, in addition to the succinic acid mentioned hereinbefore, as well as the amino-, tri-or polycarboxylic acids that have been taught in U.S. Pat. No. 3,519,501. It is advantageous for ease in coating preparation, that all reducing agent substances present, as in combinations of reducing agents, be water soluble.

Thus substantially all the coating compositions contemplated in the present invention are simply water-based for economy. It is to be understood however that ingredients such as reducing agent can contribute to the composition liquid medium. For example, polyhydric alcohol may provide up to about 5 weight percent of such medium. But, for additional substances for supplying minor amounts of liquid medium, there have been taught, as in U.S. Pat. No. 3,437,531 blends of chlorinated hydrocarbons and tertiary alcohols including tertiary butyl alcohol.

Another useful component most always present for the coating composition is pH adjusting agent, or "modifier". The use of such agent, most notably zinc oxide, has been shown to be heretofore useful for adjusting the pH of aqueous chromic acid solutions. It is critical that when pH adjusting agent is present that some to all of the pH adjusting agent be cobalt compound. Although the focus of the present invention is substantially to low-cure coating compositions, the compositions that contain cobalt demonstrate enhanced corrosion resistance, whereby these compositions may be low-cure or conventional or high-cure compositions. It is advantageous for ease in preparation of the coating composition that the cobalt compound be water soluble. However, particularly where several compounds may be employed, it is not necessary that all the compound be soluble so long as they can be well dispersed, e.g., dispersible compound could it be added separately as the bath is being prepared. Where the cobalt compound supplies the pH adjusting agent, it should be present in an amount from about 2 to 100 grams per liter of total coating composition. Less than about 2 grams per liter of cobalt compound can be insufficient for providing best compound characteristics to the coating composition. On the other hand, greater than about 100 grams per liter of compound can be uneconomical. For best economy provided with best coating characteristics, it is preferred that there be present in the coating composition from about 3 to about 30 grams per liter of compound, basis total coating composition.

Where the cobalt compound is supplemented by additional pH adjusting agent, e.g., zinc oxide, it will be most useful if the cobalt compound supplies at least about 50 weight percent of total pH adjusting agent. The use of less than 50 weight percent of cobalt compound for the total pH adjusting agent can be insufficient for providing augmented coating characteristics, such as corrosion resistance for substrate metal metal exposed by cuts or nicks. Such exposed metal protection is often hereinafter referred to as "cut edge" protection. Preferably for best cut edge protection, the cobalt compound will supply from 75 to about 100 weight percent of the pH adjusting agent.

The suitable cobalt compound used in the coating composition can be selected on the basis of the anion introduced into the composition. For example, for a great variety of coating characteristics including best weldability, the composition should be phosphate-free. Thus care should be taken not to introduce phosphate anion into the composition when selecting cobalt compound. Serviceable cobalt compounds that can or have been used include cobalt chromate, carbonate, acetate, sulfamate, naphthenate, propionate and mixtures thereof. Preferably for ease in formulating the coating composition as well as for economy, the cobalt compound is cobalt carbonate. Such compound when present in an amount from about 2 to 100 grams per liter of total coating composition will supply from about 1 to 50 grams per liter of cobalt. A greater amount than 50 grams per liter can be uneconomical, while less than the 1 gram per liter can be insuffcient for best coating composition characteristics. Usually the cobalt compound will be present in an amount from about 10 to about 60 grams per liter of coating composition.

The pH adjustment agents are typically initially present together in an individual package. This package can contain chromic acid and initially have, from the acid for example, a pH of 1 or below, e.g., less than 0.8. The reducing agent may also be present in such package. The amount of pH adjusting agent will be sufficient to elevate the pH of the package to above 1, and typically to a pH in the range of about 1.1-4, but most always not above about 5. In usual practice then, the agent is blended into the package to provide for adjusted pH of the package of above about 1 and up to about 5, inclusive. As a result, the total composition will typically have a pH within the range of from about 4 to about 5.5. The amount of agent actually used will depend upon the concentration of the chromic acid in the package and, additionally, for example, on the concentration of reducing agent and on the neutralizing strength of the particular pH adjusting agent. Such adjusted pH packages have been discussed for example in U.S. Pat. No. 3,970,482.

An additional component hat will often be present in the coating composition is the pulverulent metal. The presence of pulverulent metal in such compositions has been previously discussed in U.S. Pat. No. 3,671,331. Most usually, the particulate metal will be pulverulent zinc, although pulverulent aluminum is contemplated as well as blends, including pulverulent aluminum and particulate zinc and alloys thereof. It is to be understood however that the coating compositions without particulate metal, e.g., containing substance such as chromic acid together with cobalt compound, carboxylic acid and polyhydric alcohol, can be expecially useful for coating metal substrates. These compositions can provide corrosion resistance to metal substrates, often after only low-temperature cure.

The particulate metal portion of the coating composition when present should be present in an amount sufficient to provide at least about 50 grams per liter of the pulverulent metal. There further should be sufficient of the chromium component to provide in the coating composition a weight ratio of chromium, expressed as $CrO_3$ to pulverulent metal of not substantially less than about 0.08:1. A ratio of less than that may not provide sufficient chromium in the subsequent coating to achieve augmented bonding of the pulverulent metal to the metal substrate.

On the other hand, a ratio greater than about 0.4:1 may detract from the most enhanced corrosion resistance for the coated substrate. Thus, for an exemplary composition containing about 200 grams per liter of pulverulent metal, the chromium component should be sufficient to provide in the coating composition between about 15–80 grams of $CrO_3$ per liter of coating composition.

The coating composition may additionally contain a variety of additives. Such can include the viscosity modifiers including thickening agents, most typically the xanthan gum hydrophilic colloids. Additional thickeners include other gum thickeners which can be used in mixture, especially with the xanthan gum. Cellulose ethers may also be employed in thickening. Additional agents include wetting agents and suspending agents and the like. These may also be dispersing agents, and those typically used may be hydroxyl-containing hydrocarbon ethers. Such ethers more particularly include the alkyl ethers of alkylene glycols such as butyl ether of propylene glycol and the oxyalkyl ethers of alkylene glycols. Further additives may include preservatives. Some to all of these agents, together with the particulate metal, may be preblended. Preblended compositions of zinc flake and thickener have been discussed, for example, in U.S. Pat. No. 3,940,280.

These other compounds may further include inorganic salts often typically employed in the metal coating art for imparting some corrosion resistance or enhancement in corrosion resistance for metal surfaces. Such materials include zinc chloride, magnesium chloride and various molybdates, or the like, and these are all preferably avoided, but if present, are most usually employed in the liquid composition in a total maximum combined amount of less than about 5-10 grams per liter. Further, as mentioned hereinabove, the composition should be phosphate-free. Also, it should be substantially resin-free, e.g., contain less than 5 grams per liter of resin, and is preferably completely resin-free.

For storage considerations, the particulate metal may often be packaged individually. As mentioned hereinbefore, it may be pre-blended with composition additives such as thickening agent, as well as with preservative and dispersing agent. Other ingredients may also be available as pre-blended packages of ingredients. For example, as discussed hereinbefore in regard to pH adjustment, the hexavalent-chromium-providing compound and cobalt compound may be present in a preblended package. This package may further contain any additional pH adjustment agent. So that there will be no deleterious package reduction of hexavalent-chromium during storage or handling, this package will usually not contain reducing agent. Thus the reducing agent will almost always be pre-blended as a component by itself in liquid medium, e.g., water. This pre-blend can however contain both dicarboxylic acid as well as polyhydric alcohol reducing agent. Usually both the acid and the alcohol will be present in the package in an amount from about 5 to about 20 weight percent for each, basis total package weight. It is contemplated that where various additives will be used, they may be included in the various packages, e.g., a dispersing agent and reducing agent package. Exemplary specific packages and their utilization in preparing a coating composition will be more fully discussed hereinbelow in connection with the examples.

For the metal substrates containing applied coating composition, the subsequent curing of the composition on the substrate will usually be a hot air oven cure, although other curing procedures can be used, e.g., infrared baking. For economical curing, the special combination of carboxylic acid and polyhydric alcohol will have been used as reducing agent in the composition. This will permit a low temperature cure of applied coating composition. Such low cure can be dependent upon the subsequent application of a heat-cured topcoat. For example, where a topcoat will be applied that will be heat-cured at elevated temperature, e.g., on the order of 350° F. or more, the low temperature cure for the pre-paint coating may generally be in the range of from about 300° F. to about 350° F. peak metal temperature. Without such subsequent topcoating the low temperature cure will typically provide a peak metal temperature within the range of from about 350° F. to about 450° F. Thus, although oven air temperatures may be more elevated, e.g., on the order of 500° F., for economy the metal temperature need not exceed about 300° F. or about 350° F., depending on subsequent processing, e.g., topcoating. More elevated cure temperatures may be employed, as with compositions containing differing or additional reducing agents. The cure temperatures, i.e., the peak metal temperatures, however do not often exceed above about 700° F. Curing, such as in a hot air convection oven, can be carried on for several minutes. More typically, and particularly with a low-cure composition, cure times may be less than 5 minutes and more typically on the order of from about 0.5 to 3 minutes. It is to be understood that cure times and temperatures can be effected where a subsequently applied, heat-cured topcoating will be used. Thus shorter time and lower temperature cures can be employed followed by a topcoating that proceeds through a more elevated temperature bake at a longer cure time.

The resulting weight of the coating on the metal substrate may vary to a considerable degree, but will always be present in an amount supplying greater than 10 milligrams per square foot of chromium, measured as chromium and not as $CrO_3$. A lesser amount will not lead to desirably enhanced corrosion resistance. Advantageously, greater than about 15 milligrams per square foot of coated substrate of chromium will be present for best corrosioh resistance, while most typically between about 20-500 milligrams per square foot of chromium, always expressed as chromium and not $CrO_3$, will be present.

Moreover, for augmented corrosion resistance there will always be present in the coating above about 5 milligrams per square foot of cobalt. It is preferred for best corrosion resistance that the cobalt be present in the coating in an amount above about 10 milligrams per square foot. Most usually the cobalt in the coating will be present in an amount from about 10 to about 200 milligrams per square foot of coated substrate. Coating weight amounts for the cobalt exceeding about 250 milligrams per square foot can be uneconomical. Also, when particulate metal is present the coated metal substrate should contain between about 50 and about 5,000 milligrams per square foot of pulverulent metal.

Furthermore, when cobalt is present the coating should have a weight ratio of chromium, expressed as chromium, to cobalt of greater than about 1.5:1, e.g., 1.75:1. At the low coating weights, as for example at 10-20 milligrams per square foot for chromium and 5-10 milligrams per square foot for cobalt, such ratio might approach 2:1. Thus a ratio in the range of about 1.5:1-3:1 or more can be readily expected to provide for enhanced corrosion resistance of the coating. At the most elevated coating weights, a 2:1 ratio is desirable for economy. On the other hand, a weight ratio of about 4:1 for chromium to cobalt will not generally be exceeded to insure the best coating characteristics imparted by the cobalt.

Before starting the treatment of the present invention it is, in most cases advisable to remove foreign matter from the metal surface by thoroughly cleaning and degreasing. Degreasing may be accomplished with known agents, for instance, with agents containing sodium metasilicate, caustic soda, carbon tetrachloride, trichloroethylene, and the like. Commercial alkaline cleaning compositions which combine washing and mild abrasive treatments can be employed for cleaning, e.g., an aqueous trisodium phosphate-sodium hydroxide cleaning solution. In addition to cleaning, the substrate may undergo cleaning plus etching.

After preparation of the resulting coated substrate, such can be further topcoated with any suitable paint, i.e., a paint or primer, including electrocoating primers and weldable primers, such as the zinc-rich primers that may be typically applied before electrical resistance welding. For example, it has already been shown in U.S. Pat. No. 3,671,331 that a primer topcoating containing a particulate, electrically conductive pigment, such as zinc, is highly serviceable for a metal substrate that is first treated with a bonding coating composition which itself contains a pulverulent metal such as finely divided zinc, with the zinc being supplied in a pre-paint coating from a composition containing hexavalent-chromium-providing substance, such as chromic acid and a reducing agent for the substance.

Other topcoating paints may contain pigment in a binder or can be unpigmented, e.g., generally cellulose lacquers, rosin varnishes, and oleoresinous varnishes, as for example tung oil varnish. The paints can be solvent reduced or they may be water reduced, e.g., latex or water-soluble resins, including modified or soluble alkyds, or the paints can have reactive solvents such as in the polyesters or polyurethanes. Additional suitable paints which can be used include oil paints, including phenolic resin paints, solvent-reduced alkyds, epoxys, acrylics, vinyl, including polyvinyl butyral and oil-wax-type coatings such as linseed oil-paraffin wax paints.

The following examples show ways in which the invention has been practiced but should not be construed as limiting the invention. In the examples, the following procedures have been employed.

PREPARATION OF TEST PANELS

Unless otherwise specifically described, test panels are typically 4×8 inch cold rolled, low carbon steel panels. Steel panels can be prepared for coating by first immersing in a cleaning solution typically containing 5 ounces, per gallon of water, of a mixture of 25 weight percent tripotassium phosphate and 75 weight percent potassium hydroxide. This alkaline bath is maintained at a temperature of about 150° F.–180° F. Panels having a surface such as electrogalvanized steel can be cleaned by immersion in an aqueous cleaner combining silicate and phosphate cleaning agents and typically having a pH of approximately 10–12. This cleaner is likewise maintained at elevated temperature. Following the immersion, the panels are scrubbed with a cleaning pad which is a porous, fibrous pad of synthetic fiber impregnated with an abrasive. Thereafter, the scrubbed panels are water rinsed and again immersed in the cleaning solution. Following removal from the solution, the panels are rinsed with tap water and preferably dried.

PRIMER TOPCOATING AND APPLICATION

When pre-painted panels are primer topcoated, unless otherwise specified, the primer used is a commercially available primer which is a zinc-rich weldable primer having a weight per gallon of about 15.2 lbs., a solids volume of about 27%, and containing about 62 weight percent of nonvolatiles. The binder component is prepared from a high molecular weight epoxy resin. The primer has a typical viscosity of about 80 seconds as measured on a No. 4 Ford cup. This primer is typically applied to pre-painted panels by drawing the primer down over the panel with a draw bar to provide a smooth, uniform primer coat, generally of about 0.3–0.5 mil thickness. Resulting coated panels are usually cured for about 0.5–3 minutes in an oven at about 500°–550° F.

ADHESION/CORROSION TEST

The corrosion resistance of the coating system on the panel under extreme conditions can then be measured by first subjecting the coating to an adhesion test. In this test, cleaned and coated panels, cleaned in a manner such as above-described, are pressed with a cup-like impression.

In the test, more specifically, there is used a cup ductility machine of the motor driven hydraulically actuated type. In general, an unlubricated, coated test panel is held firmly between male and female dies, by grippers at the perimeter of the die covering. The coated side of the panel faces the female die. A ball is forced in the aperture of the male die, resulting in the pushing and stretching of part of the panel into the cup-like impression of the female die. The test employs a female die cup diameter of 1 inch, a ball diameter of $\frac{7}{8}$-inch, and provides a cup or "dome" depth, from the under surface of the flat panel to the under surface of the cup, of 0.3-inch. The resulting "domed" panel is then subjected to the below described corrosion resistance test.

CORROSION RESISTANCE TEST (ASTM B-117) AND RATING

Corrosion resistance of coated parts is measured by means of the standard salt spray (fog) test for paints and varnishes ASTM B-117. In this test, the parts are placed in a chamber kept at constant temperature where they are exposed to a fine spray (fog) of a 5% salt solution for specified periods of time, rinsed in water and dried. The extent of corrosion on the test parts can be expressed as percent of red rust. For a test panel portion containing a dome, the dome can be rated according to a photographic scale. Initially following coating, a pressure sensitive tape is applied to the dome. The tape is then quickly removed from the dome. This is done to determine coating adhesion. The panel is then subjected to the corrosion resistance test. In the following examples the efficacy of the dome corrosion resistance is quantitatively evaluated by rating domes against photographic standards using a numerical scale from 0 to 8, with 0 best. In general, 0 represents no red rust and retention of film integrity. An 8 represents a substantial showing of red rust.

Where test panels are scribed, the scribing is performed before corrosion resistance testing by cutting an "X" configuration on the face of the panel. The scribe lines are made through the coatings to expose the base metal. The extent of corrosion along the scribe lines is also made by visual inspection and through comparison among test panels. For edge corrosion, after coating the panel is cut to expose a fresh edge. The edge corrosion is usually measured, in millimeters, as the distance of corrosion from the edge. Or the parts can be rated for edge corrosion objectively by comparing parts, one with the other, all by visual inspection.

SPOT WELD TEST

The welding is performed with copper electrodes at an electrode gap of $\frac{3}{8}$ inch using a slow closure rate, an electrode pressure of 450 pounds, and using a weld time of 20 half cycles based on a 60 cycle frequency and a weld current of between 8,000–11,500 amps, with the coated side facing the electrode. During such welding, the substrate pulls an acceptable "button" in the peel test. In this peel test, two coupons (panels) which have been welded together by at least one spot weld are peeled apart past the weld, thereby tearing the welded spot from one of the coupons. Hence, one coupon has a hole at the place of the spot weld and the other coupon has a "button" of metal, at the place of the spot weld. The electrodes for 0.31 guage metal welding are truncated 45° cones and have a tip diameter of 0.190 inch. The buttons pulled from the initial test coupons, measured across their narrowest apparent diameter witha micrometer caliper calibrated for measuring to the nearest 0.001 inch, must be in the range of 0.190–0.200 inch across. Additionally, buttons measured in the same manner as the test approaches 2,000 spot welds must measure at least 0.160 inch across.

PRE-PAINT COATING COMPOSITION

Unless otherwise specified, compositions are formed from separately prepared constituents. The Part A constituent contains 495 grams of water, 2.5 grams of heteropolysaccharide dispersing agent, 2.3 grams of formalin, and 0.5 gram of a wetter which is a nonionic, modified polyethoxide adduct having a viscosity in centipoises at 25° C. of approximately 800–900 and a density at 25° C. of 8.4 lbs. per gallon. For particulate metal containing coating compositions, these will often include a Part B zinc dust. The zinc dust has all particles finer than 18 microns and an average particle size of about 3–8 microns. Moreover about 95 percent of the particles have size less than 10 microns and 99% are finer than 15 microns. For control purposes, usually a Part C will be used which contains 483 grams of water, 32 grams of chromic acid, 5.3 grams of succinic acid, 12 grams of zinc oxide and 1.3 grams of succinimide. For invention compositions, unless otherwise specified, there will be used a Part C of 448 grams water, 31.5 grams chromic acid and 20 grams cobalt carbonate. There will also be used a Part D of 30 grams water, 3.5 grams malic acid and 4.2 grams glycerine. To prepare a coating composition from all these components, the usual order of addition of the parts to one another, is as follows: Part B is dispersed in Part A. Then Part C is added to the dispersion followed by the addition of Part D thereto, when such is used.

APPLICATION OF COATING TO TEST PARTS AND COATING WEIGHT

Clean panels are typically coated by dip coating at 20 inches/minute into coating composition, removing and then immediately baking, or air drying at room temperature until the coating is dry to the touch and then baking. Baking proceeds in a hot air convection oven at temperatures and with times as specified in the examples.

Coating weights for coated articles, as chromium, and not as $CrO_3$, and as particulate metal, e.g., zinc, both being typically in weights in milligrams per square foot of coated substrate, have been presented in the examples. Such weights are determined by a portable x-ray fluorescence spectroscope. The lithium fluoride analyzing crystal is set at the required angle to determine chromium, and at the required angle to determine zinc. The instrument is initially standardized with coatings containing known amounts of these elements. The machine is adapted with a counter unit and the count for any particular coating is translated into milligrams per square foot by comparison with a preplotted curve.

EXAMPLE 1

Parts A and B as above-described were combined with a Part C of 451 grams water with 30 grams chromic acid and 19.5 grams cobalt carbonate. Equal aliquots of the composition were combined with various acid solutions to provide 185 milliliters (mls) additional solution. One aliquot contained 5 grams (gms) glycolic acid, one contained 3.1 gms citric acid, a third contained 4.0 gms tartaric acid and a final aliquot contained 2.23 gms succinic acid. Test panels as described hereinbefore were coated in the manner as described above with these compositions.

For curing, panels were oven baked in the general manner described hereinabove. However, owing to the presence of cobalt ion, peak metal temperatures were 380° F., with the oven air temperature being 500° F. In the coating insolubility test ("cure" test), all of the compositions containing the various test acids and using cobalt ion demonstrated acceptable cure although cured at such low temperature. The insolubility test is conducted by placing a drop of concentrated ammonium hydroxide on the coated surface. After one minute, the drop is removed with an absorbent, white cloth. The cloth is visually inspected for yellowish color. The coated surface where the drop was applied is also visually inspected. To pass the test, there must be no visible yellow coloration for the cloth, as well as no coating removal upon scrutinizing of the coating by visual inspection.

EXAMPLE 2

The substrate material used in this experiment is a 1-side electroplated steel coil. This is a commercially available electroplated steel coil using a base steel designated as draw quality, special killed. The electrodeposited layer is a nickel/zinc (approximately 14 weight percent nickel/86 weight percent zinc) having a thickness of about 0.1 mil. This corresponds to a plating weight of 20 grams per square meter of steel substrate. The unplated side is bare steel.

The pre-paint coating composition used for this test is as described hereinabove in connection with the examples but using 553 grams of the combination of Parts C plus Part D combination. This combination contained sufficient cobalt carbonate to supply 9.54 grams of cobalt ion to the composition. The composition also contained 4.5 grams of citric acid as a replacement for the succinic acid and contained no succinimide. This electrocoated steel coil is coated on a two-roll reverse roll coater coating line having a urethane cover applicator roll and a steel pick-up roll. The coil is 52 inches wide and 0.031 inch thick. The coil is hot alkali spray cleaned with abrasive brushing, all in line, followed by in line fresh water rinsing and blowing dry.

The coil proceeds through cleaning, coating and curing at a line speed of 400 feet per minute. The coating is cured at a peak metal temperature within the range of 375°–400° F. Panels cut from this coil are subjected to the above-described corrosion resistance (salt spray) test. Panels in such testing had a near perfect rating after almost 500 hours exposure.

EXAMPLE 3

The pre-paint coating composition used for this test was as described hereinabove in connection with the examples but using an invention Part C that was 91.5 weight parts water, 2.5 weight parts zinc oxide and 6 weight parts chromic acid, plus a Part D which contained 184 grams deionized water, 2.6 grams malonic acid, 1.9 grams of 1,3-propanediol and contained no cobalt ion. The coating composition was prepared by mixing these packages in the manner as above-described and test panels were prepared and coated as described hereinbefore. Test panels were twice baked to a 375° F. peak metal temperature in an oven having a 500° F. baking temperature, with the baking time for each baking being about 45 seconds.

Resulting test panels were tested in the corrosion resistance testing and exhibited a no corrosion rating after 240 hours. Some panels for testing were also zinc-rich primer topcoated with the topcoating and in the manner as described hereinabove. These panels were cured at a 375° F. peak metal temperature in an oven having a 500° F. air temperature for a time of about 45 seconds. In corrosion resistance testing, such panels exhibit nearly complete corrosion resistance after 240 hours of the test.

EXAMPLE 4

A pre-paint coating composition was prepared as described above in connection with the examples except that two Parts C were used. For control purposes a Part C was used that contained 7.5 grams of zinc oxide. A Part C used for invention purposes was free of zinc oxide and contained 13.4 grams of cobalt carbonate. Steel test panels were coated in the manner as described hereinbefore in connection with the examples. Coatings for both control and invention coated panels were cured in an oven having a 500° F. air temperature for one minute. Pre-paint coating weights were determined for the test panels in the manner as described hereinbefore. For the standard panels the pre-paint coating weights were found to be 27 milligrams of chromium per square foot of coating, expressed as chromium, and 350 milligrams per square foot of coating of zinc. A lesser amount for the invention panels was found, such finding being 25.5 for the chromium and 320 for the zinc. All test panels were then topcoated with the primer topcoating composition in the manner and with the composition all as described hereinbefore in connection with the examples. Topcoated panels were cured for 3 minutes at a 500° F. oven air temperature. The pre-painted and topcoated panels were then cupped and corrosion tested as in the above-described adhesion/corrosion resistance test. Before corrosion resistance testing, all test panels were sheared on one side to provide a fresh-cut edge. Results of such testing are shown in the table below.

TABLE 1

| Panel | Top-coat, Mils* | Corrosion Resistance | | | |
|---|---|---|---|---|---|
| | | Dome Rating* | | Cut Edge % Red Rust* | |
| | | 240 Hrs. | 576 Hrs. | 240 Hrs. | 576 Hrs. |
| Control | 0.46 | 2 | 5.75 | 46 | 70 |
| Invention | 0.47 | 0.375 | 4.25 | 18 | 40 |

*Average of four panels.

EXAMPLE 5

The composition used hereinbefore in connection with the examples was used for this test except the Parts C and D were initially control compositions which were combined and made suitable for invention purposes by replacing the zinc oxide with 13.4 grams of cobalt carbonate. The panels used were those as described above, and they were coated in the manner hereinbefore discussed. For control purposes a set of panels was prepared using the control composition presented hereinbefore in connection with the examples. These test pieces were likewise the above discussed panels as prepared and coated in the manner above-described.

Coating weights for the control panels, as well as for the test, or "invention", panels were then conducted as has been described hereinabove. For the controls there was found 25 milligrams per square foot of chromium in the coating. For the invention panels the chromium was 28. All panels, invention and control, showed in the coating 310 milligrams per square foot of zinc. All panels after coating, excepting those subsequently topcoated, were baked for 3 minutes in an oven at an oven air temperature of 500° F.

Some panels were then selected for topcoating. These panels received an application of the zinc-rich weldable primer topcoating as described hereinbefore. Panels that were topcoated, were initially baked for only 1 minute following undercoating, in an oven at an oven air temperature of 500° F., and then following cooling and primer topcoating, were baked for 3 minutes in an oven having a 500° F. air temperature.

All panels, both control and invention, and both coated and additionally primer topcoated, were sheared on one side to provide a fresh-cut edge. Panels were then domed (cupped) and corrosion tested as described hereinabove in the adhesion/corrosion test. Results of such testing are reported in Table 2 hereinbelow.

TABLE 2

| Panel | Topcoat | Corrosion Resistance: 240 Hours* | | |
|---|---|---|---|---|
| | | Dome Rating | Face % Red Rust | Edge Creep (mm.) |
| Control | No | Failed at 240 Hours** | | |
| Invention | No | 8 | 32.5 | 4.5 |
| Control | Yes | 5 | 0 | 1 |
| Invention | Yes | 5 | 0 | Nil |

*All determinations are averages for 2 panels.
**100% red rust surface on dome, face and edge.

EXAMPLE 6

A number of coating compositions were employed, with cobalt carbonate gradually replacing zinc oxide whereby the initial, or control, composition contained no cobalt and all zinc oxide while the final (an "invention") composition had all zinc oxide replaced by cobalt carbonate. The percentage of zinc ion replaced with cobalt ion is more particularly shown in Table 3 hereinbelow.

Panels were prepared for coating in the manner as described hereinbefore, and the panels were coated with the composition of Example 5 except that the 100 percent cobalt ion combined Parts C and D contained 10.7 grams of cobalt carbonate whereas the control Parts C contained 7.5 grams of zinc oxide. The ladder of compositions containing zinc oxide and replaced with cobalt ion were then prepared by mixing the appropriate amounts of aliquots of these two compositions. All combined parts Parts C and D from the 0 percent of zinc ion to the 100 percent of zinc ion and the aliquots in between were then combined with separate Parts A and B to provide test coating compositions.

The cleaned and prepared panels were coated in these combinations in the manner described hereinbefore. All coated panels were cured for 3 minutes in an oven at an oven air temperature of 500° F. For the adhesion/corrosion test, all panels were provided with a dome in the manner as described hereinbefore in connection with the examples. All test panels were also trimmed on one side to provide a fresh-cut edge.

All "domed" fresh-cut panels were then subjected to the above-described corrosion resistance test. Results for this test are shown in Table 3 below.

TABLE 3

| Percent of Zinc Ion Replaced With Cobalt Ion | Corrosion Resistance: 408 Hours | |
|---|---|---|
| | Dome* | Cut-Edge |
| 0 | 4 | fair-poor |
| 25 | 4 | fair-poor |
| 50 | 4 | poor-good |
| 75 | 0 | excellent |
| 100 | 0 | good-excellent |

*Average of two panels.

EXAMPLE 7

Test panels were prepared for coating and were coated in the manner described hereinabove. For the control coating composition, there was used the composition described hereinbefore in connection with the examples. This composition contained 7.5 grams of zinc oxide in the control Part C. For the invention composition, the succinimide in a combined Parts C and D was eliminated and the 3.33 grams of succinic acid was increased to 5.0 grams of succinic acid. Additionally, this combination of Parts C and D contained no zinc oxide, but contained 15.1 grams of cobalt carbonate. All coated panels, which were not to be topcoated, were then cured for 3 minutes in an oven of 500° F. oven air temperature. (Panels were selected for coating weight evaluation in the manner described above. The control panels were found to have 28 milligrams per square foot of chrome, as chrome, in the coating and 380 milligrams per square foot of zinc in the coating. The comparable numbers for the invention panels were 27 for the chrome and 360 for the zinc.

Panels with this coating which were to be topcoated, were baked for 1 minute in an oven at at 500° F. oven temperature, providing about 400°-425° F. peak metal temperature. These panels were then primed with the above-described zinc-rich weldable primer topcoating. Control panels were then cured to a peak metal temperature of 500° F. in an oven at a 500° F. oven air temperature. Invention panels were also cured in a 500° F. oven but to a 450° F. peak metal temperature.

Selected panels were then provided with a dome in the manner of the above-described adhesion test, while other panels were cut to prepare a fresh-cut edge. All panels for testing were then subjected to the above-described corrosion resistance test. Results of this test are shown in Table 4 hereinbelow.

TABLE 4

| | | Corrosion Resistance: 240 Hours* | | |
|---|---|---|---|---|
| Panel | Topcoat | Dome Rating | Face % Red Rust | Edge % Red Rust |
| Control | No | 4.5 | 32 | 100 |
| Invention | No | 0 | 2 | 1 |
| Control | Yes | 2 | O.K. | 52 |
| Invention | Yes | 0 | O.K. | 7 |

*Results average of three panels.

EXAMPLE 8

An electroplated steel coil as described in Example 2 was cleaned and coated in commercial operation as also described in Example 2. The line speed for the coil through the cleaning and coating operation was 430 feet per minute. The coil was coated on the electroplated side with the composition as described in Example 2. This low bake formulation was then baked twice. First in an oven at a 750°-800° F. oven air temperature to a peak metal temperature of 375°-385° F., then in a 700°-750° F. oven to a 400° F. peak metal temperature. The resulting coating was determined to be fully cured, as determined by the coating insolubility test of Example 1. Selected panels cut from this coil were then subjected to the spot weld test as discussed hereinbefore in connection with the examples. The panels showed a minimum button diameter, in inches, at 2000 spot welds of 0.192. The coil was therefore determined to have passed the spot weld test.

Additional panels were selected and subjected to priming with a cathodic electrocoat topcoat. The resulting coating by visual appearance was determined to be excellent, and the coating adhesion, as determined by cross hatch reverse impact test, was also judged to be excellent.

EXAMPLE 9

Both control and invention coating compositions were used for this test. The control composition was as described hereinbefore in connetion with the examples. For the invention composition Parts C and D were as described hereinbefore in connection with the examples, but the formulation contained 416 weight parts of Part A, 160 weight parts of Part B, 418 weight parts of Part C and 31.4 weight parts of Part D.

The substrate material used for this test was a 2-sided electroplate steel coil. This was a commercially available electroplated steel coil using a draw quality, special killed base steel. The electrogalvanized zinc coating had a weight of 65 grams per square meter (g/m$^2$) of coated base steel on the one side of the coil and a zinc coating weight of 15 g/m$^2$ of the coated base steel on the reverse coil side. This electrogalvanized steel coil was coated on the light zinc coating weight side on a 2-roll reverse roll coater coating line having a urethane cover applicator roll and a steel pick-up roll. Before coating the coil was hot-alkali spray cleaned with abrasive brushing, all on-line, followed by on-line fresh water rinsing and blowing dry.

The coil procedes through cleaning, coating and curing at a line speed of 400 feet per minute. Coil samples coated with the pre-paint coating compositions, both control and invention, were then topcoated with zinc-rich weldable primer as described hereinbefore in connection with the examples but having 65% solids by volume and a weight of 17.5 pounds per gallon. For the coil sample containing control pre-paint coating, curing proceded in the usual manner, including pre-paint curing at 310° F. peak metal temperature and weldable topcoating curing at 495° F. peak metal temperature. For the invention samples, the portion of the coil was cured after pre-paint coating at a peak metal temperature of 315° F. and after topcoating at a peak metal temperature of 385° F.

Samples for both control and invention compositions, these being 4×12-inch samples, were domed and then subjected to the above-described corrosion resistance (salt spray) test. For some of the test panel samples, panel edges were taped to retard or eliminate red rust run-down over the face of the panel during testing. For other test panels, the edges were untaped. Results of this testing are shown in Table 5 hereinbelow.

TABLE 5

| Panel | Corrosion Resistance: Dome Ratings | | |
| --- | --- | --- | --- |
| | Untaped Panels | Edge Taped Panels | |
| | 664 Hours | 664 Hours | 808 Hours |
| Control | 4.7 | 1.1 | 2.2 |
| Invention | 0.9 | 0.1 | 0.6 |

EXAMPLE 10

The substrate material used in this experiment is a 2-sided electroplated steel coil. This is a 24 inch wide, commercially produced steel coil using an aluminum killed, draw quality base steel. The electrodeposited layer is a zinc/iron alloy, coated both sides, with the alloy containing about 18–19 weight percent iron with a balance of zinc. There was an alloy coating weight of 25 g/m² on the one coil side and an alloy coating weight of 50 g/m² on the reverse side.

The invention composition of Example 9 was used for this test. The coil was coated in the manner of Example 9. The coil proceeds through cleaning, coating and curing at a line speed of 240 feet per minute. The pre-paint coating is cured at a peak metal temperature of 300° F. The coating contained 19 mg/ft² of cobalt and had a weight ratio of chromium to cobalt of about 1.8:1. Prepainted coil portions are topcoated with the weldable primer used for the invention panels of Example 9. This topcoating is cured at a peak metal temperature of 350° F.

Test panels, being 4×12-inch test panels, were then domed and subjected to the above-described corrosion resistance test. After 1,896 hours of testing, panels showed no percent red rust on panel domes.

EXAMPLE 11

The coating composition used herein was all invention composition, and all as described in Example 9. A variety of substrate materials were used for this test. All were electroplated steel coils. All of the steel coils had been electrogalvanized with a metallic zinc coating. The first coil was a commercially available electroplated steel coil having a base steel designated as aluminum killed, draw quality. The electrodeposited layer was a zinc layer having an electroplate layer coating weight of 30 g/m² on the one coil side with a layer coating weight of 20 g/m² on the reverse coil side.

The second coil was likewise a commercially available electroplated steel coil having the same quality substrate steel. For this coil, the one coil side was bare steel and on the reverse thereof was an electrodeposited layer of zinc having a plating coating weight of 30 g/m².

The third coil was an electrogalvanized steel coil as described in Example 9.

The pre-paint coating composition of Example 9 used for this test for the first coil was coated on the heavier plated side for a portion of the coil run and on the lighter plated side for an additional portion of the coil run. For the second coil, the invention composition was coated only on the plated side. For the third coil, the invention pre-paint coating composition was coated on the light 15 g/m² plated side. The coating had 19 mg/ft² of cobalt and a weight ratio of chromium to cobalt of about 1.75:1.

For all coils, the coating apparatus was a 2-roll reverse roll coater coating line having a urethane cover applicator roll and a steel pick-up roll. All coils were hot-alkali spray cleaned with abrasive brushing, all in-line, followed by in-line fresh water rinsing and blowing dry. The coils proceded through cleaning, coating and curing at a line speed of 400 feet per minute.

For the first coil the pre-paint coating composition was cured at a peak metal temperature of 320° F. For the second coil, such curing was at 315° F. for one portion of the coating, at 320° F. for a second, and at 325° F. for a third. For the third coil, the coating was cured at a 315° F. peak metal temperature.

All panels were topcoated with the zinc-rich weldable topcoating described in Example 9. For the first and third coils, these topcoatings were cured at a 385° F. peak metal temperature. For the second coil, the lowest prepaint composition cure temperature (315° F.) was topcoat cured at a peak metal temperature of 395° F. The second coil portion (pre-paint cured at 320° F.) was topcoat-cured at 350° F. peak metal temperature, and the final portion (pre-paint cure at 325° F. peak metal temperature) was topcoat-cured at 380° F. peak metal temperature.

Panels from all these coils, all being 4×12-inch test panels, were then domed and subjected to the above-described corrosion resistance (salt spray) test. Results of this test are shown in Table 6 below.

TABLE 6

| Test Coil | Pre-Paint Chromium Coating Weight | Topcoat Thickness Mils | Dome Rating* 1,120 Hours |
| --- | --- | --- | --- |
| No. 1 30 Side | 35 | 0.35 | 3.1 |
| No. 1 20 Side | 36 | 0.42 | 3.5 |
| No. 2 315° F. Cure | 26 | 0.38 | 5.6 |
| No. 2 320° F. Cure | 36 | 0.41 | 5.3 |
| No. 2 325° F. Cure | 36 | 0.38 | 6.2 |
| No. 3 15 Side | 33 | 0.38 | 4.1 |

*Average of five panels.

Coating weights for the pre-paint coatings were determined for sample panels in accordance with the method as described hereinbefore in connection with the examples. Primer topcoating thicknesses were determined by eddy current measurement.

Additionally, for control purposes a coil was coated with control pre-paint coating composition as described hereinbefore in connection with the examples. This control coil had the control pre-paint composition cured at a peak metal temperature of 315° F. This coil had a zinc-rich weldable topcoating as described in Example 9 which was cured at 500° F. peak metal temperature. This control coil was coated in the manner of the other coils. These control panels can be expected to have a coated chromium weight for the pre-paint coating of 25 mg/ft² and have a topcoating thickness of 0.58 mil. For control purposes, these test panels from this coil were domed and likewise subjected to the above-described corrosion resistance test. These panels showed an average rating on the dome of 5.8 after only 760 hours of testing, (compared to a range of 0.2–1.7 for the invention panels), at which time the test was terminated for these control panels.

EXAMPLE 12

The substrate material used in this experiment is a one side bare steel and one side electrogalvanized steel having a zinc coating weight of 30 g/m$^2$. The invention coating composition contained 500 mls. of Part A, 472 mls. of Part C, 37.3 grams of Part D and had 4 grams of zinc oxide added to provide a composition pH of 5.55.

Panels of the one-side galvanized were coated on both sides with the pre-paint coating composition in the manner described hereinbefore in connection with the examples. Coated panels were then oven baked in the manner described hereinbefore to a peak metal temperature of 325° F. Cooled panels were next coated with the weldable primer of Example 9 in the manner described in connection with the examples. The topcoated panels were then cured at a peak metal temperature of 375° F.

Test panels, being 4×12-inch test panels, were then domed and the coated, electrogalvanized panel sides were subjected to the above-described corrosion resistance test. After 696 hours of testing, 16 of 24 panels showed no red rust on panel domes and the balance averaged about 3 percent red rust.

What is claimed is:

1. A hexavalent-chromium and pulverulent metal containing coating composition that is at least substantially resin-free, which composition provides corrosion resistance when applied to, and heat cured on, a metal substrate, said composition being especially adapted for application to a plated metal substrate, as well as adapted to low temperature cure thereon, which composition comprises a heat-curable, phosphate-free bonding coating composition containing pulverulent metal, hexavalent-chromium-providing compound in amount sufficient to provide a coating of above 10 milligrams per square foot of chromium, as chromium, cobalt compound and reducing agent for said hexavalent chromium, wherein the cobalt compound supplies cobalt in excess of 2 grams per liter to not in excess from about 50 gram per liter for each liter of coating composition, and wherein the hexavalent-chromium providing compound is supplied by one or more of chromic acid or a salt thereof including dichromate salts not in excess of about 200 grams of chromium per liter of coating composition, said chromium being expressed as CrO$_3$.

2. The composition of claim 1 wherein said pulverulent metal is selected from the group consisting of magnesium aluminum, manganese, zinc, their alloys and mixtures including intermetallic mixtures.

3. The composition of claim 1 wherein said cobalt compound is selected from the group consisting of cobalt chromate, carbonate, acetate, sulfamate, naphthenate, propionate and mixtures thereof.

4. The composition of claim 1 wherein said reducing agent includes saturated carboxylic acid selected from the group consisting of straight chain aliphatic, branched chain aliphatic and cycloaliphatic acids or mixtures thereof, and said carboxylic acid is present in said coating composition in an amount between about 0.5–50 grams per liter.

5. The composition of claim 4 wherein said carboxylic acid includes one or more of a C$_2$–C$_{14}$ acid.

6. The composition of claim 5 wherein said carboxylic acid includes one or more of a C$_2$–C$_6$ hydroxyl-containing carboxylic acid.

7. The composition of claim 5 wherein said carboxylic acid includes one or more of a C$_3$–C$_6$ dicarboxylic acid.

8. The composition of claim 4 wherein said carboxylic acid is selected from the group consisting of malonic, malic, citric, glycolic, lactic, tartaric, tartronic and succinic acids as well as mixtures thereof.

9. The composition of claim 1 wherein said reducing agent includes polyhydric alcohol selected from the group consisting of saturated or unsaturated straight chain aliphatic, branched chain aliphatic and cycloaliphatic alcohols or mixtures thereof, and said polyhydric alcohol is present in said coating composition in an amount between about 0.5–50 grams per liter.

10. The composition of claim 9 wherein said polyhydric alcohol includes one or more of a C$_2$–C$_8$ alcohol.

11. The composition of claim 9 wherein said polyhydric alcohol contains no more than three hydroxyl groups per molecule and is selected from the group consisting of glycerol, ethylene glycol, 1,3-propanediol, 2-butene-1,4-diol, cyclohexanedimethanol, 2-butyne-1,4-diol and their mixtures.

12. The composition of claim 1 characterized by containing one or more substances selected from the group consisting of pH modifiers, viscosity modifiers, dispersing agents and preservatives.

13. The composition of claim 1 characterized by being in liquid medium provided by one or more of water, alcohol, halogenated hydrocarbon solvent and mixtures thereof.

14. A hexavalent-chromium and pulverulent metal containing coating composition that is phosphate-free and at least substantially resin-free, which composition provides corrosion resistance when applied to, and heat cured on, a metal substrate, said composition being especially adapted for application to a plated metal substrate, which composition comprises pulverulent metal, hexavalent-chromium-providing compound in an amount sufficient to provide a coating of above 10 milligrams per square foot of chromium as chromium and cobalt compound, wherein the cobalt compound supplies cobalt in excess of 2 grams per liter to not in excess from about 50 gram per liter for each liter of coating composition, and wherein the hexavalent-chromium providing compound is supplied by one or more of chromic acid or a salt thereof including dichromate salts not in excess of about 200 grams of chromium per liter of coating composition, said chromium being expressed as CrO$_3$.

15. The composition of claim 14 wherein said pulverulent metal is selected from the group consisting of magnesium, aluminum, manganese, zinc, their alloys and mixtures including intermetallic mixtures.

16. The composition of claim 14 wherein said cobalt compound is selected from the group consisting of cobalt chromate, carbonate, acetate, sulfamate, naphthenate, propionate and mixtures thereof, 17. The composition of claim 14 characterized by being provided in liquid medium supplied by one or more of water, alcohol, halogenated hydrocarbon solvent and mixtures thereof.

18. A hexavalent-chromium-containing coating composition that is at least substantially resin-free, which composition provides corrosion resistance when applied to, and heat cured on, a metal substrate, said composition being especially adapted for application to a plated metal substrate, as well as adapted to low temperature cure thereon, which composition comprises a heat-curable, phosphate-free bonding coating composition containing hexavalent-chromium-providing compound in amount sufficient to provide a coating of above 10 milligrams per square foot of chromium, as chromium, cobalt compound, carboxylic acid and polyhydric alcohol, wherein the cobalt compound supplies cobalt in excess of 2 grams per liter to not in excess from about 50 gram per liter for each liter of coating composition, and wherein the hexavalent-chromium providing compound is supplied by one or more of chromic acid or a salt thereof including dichromate salts not in excess of about 200 grams of chromium per liter of coating composition, said chromium being expressed as $CrO_3$.

19. The composition of claim 18 wherein said cobalt compound is selected from the group consisting of cobalt chromate, carbonate, acetate, sulfamate, naphthenate, propionate and mixtures thereof.

20. The composition of claim 18 wherein said carboxylic acid is saturated carboxylic acid selected from the group consisting of straight chain aliphatic, branched chain aliphatic and cycloaliphatic acids or mixtures thereof, and said acid is present in an amount between about 0.5–50 grams per liter of said coating composition.

21. The composition of claim 18 wherein said carboxylic acid includes one or more of a $C_2$-$C_{14}$ acid.

22. The composition of claim 18 wherein said carboxylic acid includes one or more of a $C_2$-$C_6$ hydroxyl-containing carboxylic acid.

23. The composition of claim 18 wherein said carboxylic acid includes one or more of a $C_3$-$C_6$ dicarboxylic acid.

24. The composition of claim 18 wherein said carboxylic acid is selected from the group consisting of malonic, malic, citric, glycolic, lactic, tartaric, tartronic and succinic acids as well as mixtures thereof.

25. The composition of claim 18 wherein said polyhydric alcohol is selected from the group consisting of saturated or unsaturated straight chain aliphatic, branched chain aliphatic and cycloaliphatic alcohols or mixtures thereof, and said alcohol is present in an amount between about 0.5–50 grams per liter of said coating composition.

26. The composition of claim 18 wherein said polyhydric alcohol includes one or more of a $C_2$-$C_8$ alcohol.

27. The composition of claim 18 wherein said polyhydric alcohol contains no more than three hydroxyl groups per molecule and is selected from the group consisting of glycerol, ethylene glycol, 1,3-propanediol, 2-butene-1,4-diol, cyclohexanedimethanol, 2-butyne-1,4-diol and their mixtures.

28. The composition of claim 18 characterized by being phosphate-free and being provided in liquid medium supplied by one or more of water, alcohol, halogenated hydrocarbon solvent and mixtures thereof.

29. In a phosphate-free and substantially resin-free coating composition for application to, and heat curing on, a metal substrate, comprising reducing agent for hexavalent chromium, plus a chromic acid component in liquid medium, which component contains hexavalent chromium in an amount sufficient to provide a coating of above 10 milligrams per square foot of chromium as chromium and inorganic pH modifier substituent, the improvement comprising a chromic acid component containing a cobalt compound therein in an amount replacing from 50 weight percent to all of said pH modifier substituent, wherein the cobalt compound supplies cobalt in excess of 2 grams per liter to not in excess from about 50 gram per liter for each liter of coating composition, and wherein the hexavalent-chromium providing compound is supplied by one or more of chromic acid or a salt thereof including dichromate salts not in excess of about 200 grams of chromium per liter of coating composition, said chromium being expressed as $CrO_3$.

30. The composition of claim 29 wherein said component liquid medium includes water and said composition further contains particulate metal.

31. The composition of claim 29 wherein said cobalt compound is selected from the group consisting of cobalt chromate, cobalt carbonate, acetate, sulfamate, naphthenate, propionate and mixtures thereof.

32. The composition of claim 29 wherein said component has a pH of at least about 4.

33. The composition of claim 29 wherein said component liquid medium contains at least about 20 grams per liter of chromium, expressed as $CrO_3$, and at least about 10 grams per liter of cobalt compound.

34. A coated metal substrate having on the surface thereof an adherent, corrosion resistant, substantially resin-free and water-insoluble coating which coating comprises above 10 milligrams per square foot of chromium, as chromium, above about 5 milligrams per square foot of cobalt, as cobalt, and above about 50 milligrams per square foot of pulverulent metal selected from the group consisting of zinc, aluminum, manganese, magnesium, mixtures thereof and alloys of same, said coating having a weight ratio of chromium, as chromium, to cobalt of greater than about 1.5:1, with the coating being the heat-cured residue of a composition comprising said pulverulent metal, hexavalent-chromium-providing compound, cobalt compound and reducing agent for said hexavalent chromium, wherein the cobalt compound supplies cobalt in excess of 2 grams per liter to not in excess from about 50 gram per liter for each liter of coating composition, and wherein the hexavalent-chromium providing compound is supplied by one or more of chromic acid or a salt thereof including dichromate slats not in excess of about 200 grams of chromium per liter of coating composition, said chromium being expressed as $CrO_3$.

35. The coated metal substrate of claim 34 wherein said metal substrate is selected from the group consisting of aluminum, copper, titanium, tin, lead, chromium, magnesium, ferrous, zinc, nickel, cadmium, cobalt and chromium metal substrates as well as from alloys and intermetallic mixed metal substrates of the foregoing metals and including substrates plated with one or more of said metals.

36. The coated metal substrate of claim 35 wherein the substrate metal contains a zinc coating selected from the group consisting of galvanized and zinc electroplate coating wherein the coating contains zinc, zinc alloy or intermetallic mixture including zinc.

37. The coated metal substrate of claim 34 wherin said coated substrate is further topcoated.

38. A coated metal substrate having on the surface thereof an adherent, corrosion resistant, substantially resin-free and water-insoluble coating which coating comprises above 10 milligrams per square foot of chromium, as chromium, above about 5 milligrams per square foot of cobalt, as cobalt, and above about 50 milligrams per square foot of pulverulent metal selected from the group consisting of zinc, aluminum, manganese, magnesium, mixtures thereof and alloys of same, said coating having a weight ratio of chromium, as chromium, to cobalt of greater than about 1.5:1, with the coating being the heat-cured residue of a composition comprising said pulverulent metal, hexavalent-chromium-providing compound and cobalt compound, wherein the cobalt compound supplies cobalt in excess of 2 grams per liter to not in excess from about 50 gram per liter for each liter of coating composition, and wherein the hexavalent-chromium providing compound is supplied by one or more of chromic acid or a salt thereof including dichromate salts not in excess of about 200 grams of chromium per liter of coating composition, said chromium being expressed as $CrO_3$.

39. The coated metal substrate of claim 38 wherein said metal substrate is selected from the group consisting of aluminum, copper, titanium, tin, lead, chromium, magnesium, ferrous, zinc, nickel, cadmium, cobalt and chromium metal substrates as well as from alloys and intermetallic mixed metal substrates of the foregoing metals and including substrates plated with one or more of said metals.

40. The coated metal substrate of claim 38 wherein the substrate metal contains a zinc coating selected from the group consisting of galvanized and zinc electroplate coating wherein the coating contains zinc, zinc alloy or intermetallic mixture including zinc.

41. The coated metal substrate of claim 38 wherein said coated substrate is further topcoated.

42. A coated metal substrate having on the surface thereof an adherent, corrosion resistant, substantially resin-free and water-insoluble coating which coating comprises above 10 milligrams per square foot of chromium, as chromium, above about 5 milligrams per square foot of cobalt, as cobalt, and above about 50 milligrams per square foot of pulverulent metal selected from the group consisting of zinc, aluminum, manganese, magnesium, mixtures thereof and alloys of same, said coating having a weight ratio of chromium, as chromium, to cobalt of greater than about 1.5:1, with the coating being the heat-cured residue of composition comprising said pulverulent metal, hexavalent-chromium-providing compound, cobalt compound, carboxylic acid and polyhydric alcohol, wherein the cobalt compound supplies cobalt in excess of 2 grams per liter to not in excess from about 50 gram per liter for each liter of coating composition, and wherein the hexavalent-chromium providing compound is supplied by one or more of chromic acid or a salt thereof including dichromate salts not in excess of about 200 grams of chromium per liter of coating composition, said chromium being expressed as $CrO_3$.

43. The coated metal substrate of claim 42 wherein said metal substrate is selected from the group consisting of aluminum, copper, titanium, tin, lead, chromium, magnesium, ferrous, zinc, nickel, cadmium, cobalt and chromium metal substrates as well as from alloys and intermetallic mixed metal substrates of the foregoing metals and including substrates plated with one or more of said metals.

44. The coated metal substrate of claim 42 wherein the substrate metal contains a zinc coating selected from the group consisting of galvanized and zinc electroplate coating wherein the coating contains zinc, zinc alloy or intermetallic mixture including zinc.

45. The coated metal substrate of claim 42 wherein said coated substrate is further topcoated.

* * * * *